United States Patent
Kim et al.

(10) Patent No.: US 9,490,642 B2
(45) Date of Patent: Nov. 8, 2016

(54) CHARGING METHOD OF SECONDARY BATTERY WITH CONSTANT CURRENT USING HIGH CHARGE RATE

(71) Applicant: LG CHEM, LTD., Seoul (KR)

(72) Inventors: Dae Hwan Kim, Daejeon (KR); Seung Hun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 14/399,716

(22) PCT Filed: Jun. 7, 2013

(86) PCT No.: PCT/KR2013/005010
§ 371 (c)(1),
(2) Date: Nov. 7, 2014

(87) PCT Pub. No.: WO2013/183952
PCT Pub. Date: Dec. 12, 2013

(65) Prior Publication Data
US 2015/0123621 A1    May 7, 2015

(30) Foreign Application Priority Data

Jun. 7, 2012   (KR) .................. 10-2012-0060773

(51) Int. Cl.
*H02J 7/00* (2006.01)
*H02J 7/04* (2006.01)
(Continued)

(52) U.S. Cl.
CPC .......... *H02J 7/0052* (2013.01); *H01M 10/446* (2013.01); *H02J 7/0077* (2013.01); *H02J 7/045* (2013.01); *H01M 10/052* (2013.01); *H02J 7/041* (2013.01)

(58) Field of Classification Search
CPC ...... H02J 7/0052; H02J 7/045; H02J 7/0077; H02J 7/041; H01M 10/446; H01M 10/052
See application file for complete search history.

(56) References Cited

U.S. PATENT DOCUMENTS 4,238,721 A * 12/1980 DeLuca ................ H02J 7/0016
320/122
5,179,335 A *  1/1993 Nor ....................... H02J 7/0085
320/159
5,994,878 A * 11/1999 Ostergaard ............ H02J 7/0004
320/132

(Continued)

FOREIGN PATENT DOCUMENTS

CN          101213717 A       7/2008
EP          0 055 349 A2      7/1982
(Continued)

OTHER PUBLICATIONS

International Search Report issued in PCT/KR2013/005010, mailed on Aug. 28, 2013.

*Primary Examiner* — Naum B Levin
(74) *Attorney, Agent, or Firm* — Birch, Stewart, Kolasch & Birch, LLP

(57) ABSTRACT

Disclosed herein is a charging method of a secondary battery including a first charging step of charging the secondary battery at a first C-rate from an initial charge voltage to a first charge voltage and a second charging step of charging the secondary battery to a target voltage while gradually decreasing a C-rate within a range not exceeding the first C-rate after the voltage of the secondary battery reached the first charge voltage. Consequently, it is possible to prevent deterioration of the battery, thereby improving lifespan characteristics of the battery.

6 Claims, 3 Drawing Sheets

(51) Int. Cl.
*H01M 10/44* (2006.01)
*H01M 10/052* (2010.01)

(56) References Cited

U.S. PATENT DOCUMENTS

| | | | |
|---|---|---|---|
| 6,107,782 A | 8/2000 | Imai et al. | |
| 7,115,339 B2 * | 10/2006 | Nakajima | H01M 2/1646 429/129 |
| 7,541,715 B2 * | 6/2009 | Chiang | F03G 7/005 310/311 |
| 7,579,114 B2 | 8/2009 | Ohzuku et al. | |
| 7,799,461 B2 * | 9/2010 | Gozdz | H01M 4/13 429/231.95 |
| 8,552,693 B2 * | 10/2013 | Paryani | H02J 7/047 320/104 |
| 8,610,408 B2 * | 12/2013 | Nakai | H01M 4/485 320/160 |
| 9,159,990 B2 * | 10/2015 | Amiruddin | H01M 4/131 |
| 9,197,089 B2 * | 11/2015 | Choe | H02J 7/007 |
| 2008/0169790 A1 * | 7/2008 | Gozdz | H01M 4/13 320/160 |
| 2011/0012562 A1 * | 1/2011 | Paryani | H02J 7/047 320/152 |
| 2011/0316487 A1 * | 12/2011 | Nakai | H01M 4/485 320/160 |

FOREIGN PATENT DOCUMENTS

| | | |
|---|---|---|
| EP | 0 903 831 A2 | 3/1999 |
| EP | 1 729 394 A1 | 12/2006 |
| EP | 2 276 139 A2 | 1/2011 |
| JP | 9-17451 A | 1/1997 |
| JP | 10-145979 A | 5/1998 |
| JP | 10-145981 A | 5/1998 |
| JP | 11-97074 A | 4/1999 |
| JP | 11-297365 A | 10/1999 |
| JP | 2001-186684 A | 7/2001 |
| JP | 2003-87991 A | 3/2003 |
| JP | 2005-318790 A | 11/2005 |
| JP | 2007-311107 A | 11/2007 |
| JP | 2011-211846 A | 10/2011 |
| KR | 2000-0019006 A | 4/2000 |
| KR | 10-0633287 B1 | 10/2006 |
| KR | 10-2009-0062254 A | 6/2009 |
| KR | 10-2009-0078128 A | 7/2009 |
| KR | 10-2009-0105868 A | 10/2009 |
| KR | 10-2011-0024707 A | 3/2011 |
| WO | WO 03/107505 A2 | 12/2003 |
| WO | WO 2007/004098 A1 | 1/2007 |
| WO | WO 2008/117238 A2 | 10/2008 |
| WO | WO 2011/053280 A1 | 5/2011 |

\* cited by examiner

CHARGING METHOD OF SECONDARY BATTERY WITH CONSTANT CURRENT USING HIGH CHARGE RATE

TECHNICAL FIELD

The present invention relates to a charging method of a secondary battery and, more particularly, to a charging method of a secondary battery including a first charging step of charging the secondary battery at a first C-rate from an initial charge voltage to a first charge voltage and a second charging step of charging the secondary battery to a target voltage while gradually decreasing a C-rate within a range not exceeding the first C-rate after the voltage of the secondary battery reached the first charge voltage.

BACKGROUND ART

In recent years, as mobile devices, such as a portable computer, a mobile phone, and a camera, have been increasingly developed, and the demand for such mobile devices has increased, the demand for secondary batteries has also sharply increased as an energy source for the mobile devices. Among such secondary batteries is a lithium secondary battery having a high energy density and operation potential, a long cycle lifespan, and a low self discharge rate, into which much research has been carried out and which is now commercialized and widely used.

The secondary batteries may be recharged after being discharged such that the secondary batteries can be continuously used. However, the secondary batteries have different performances based on charge and discharge states. For this reason, efforts have been made to improve a charging method of the secondary batteries such that the performance of the secondary batteries can be enhanced.

FIG. 1 is a view showing a relationship between a charge current and a charge voltage in a conventional constant current (CC)-constant voltage (CV) charging method (hereinafter, referred to a CC-CV charging method), which is generally used as the charging method of the secondary battery as described above. As shown in FIG. 1, the CC-CV charging method is a method of charging the secondary battery at the maximum current until voltage of the secondary battery reaches a predetermined battery voltage and charging the secondary battery while gradually decreasing the charging current after the voltage of the secondary battery reaches the predetermined battery voltage.

FIG. 2 is a view showing a relationship between a charge period per step shown in FIG. 1 and a charge time. At a first step, the battery is charged with a constant current until the voltage of the battery voltage is increased to a charge limit voltage. When the voltage of the battery voltage is increased to the charge limit voltage, at a second step, the battery is saturated and the battery is charged while the charge current is gradually decreased. At this time, the voltage of the battery voltage reaches the maximum battery voltage. Subsequently, auxiliary charge is carried out for the battery based on the voltage of the battery. For a lithium ion battery, overcharge using overvoltage is not possible and trickle charge may damage the battery. For this reason, auxiliary charge is carried out while no trickle charge is applied. (The trickle charge is a method of continuously supplying a charge current having a size approximate to that of a self discharge current to a storage cell such that the storage cell always remains charged in a case in which the storage cell is used as an emergency electrode.)

During a constant current charge period (step 1), the battery is charged with a low constant current having a rate of 0.5 C or less for about one hour. As a result, a topping charge period (step 2) after the constant current charge period is relatively long. In addition, time or current is sensed to control the completion of charge. In the conventional CC-CV charging method, therefore, a C-rate is directly proportional to time.

In the conventional charging method as described above, a charge rate is about 85% or less when the battery is charged for 100 minutes. In order to achieve a charge rate of at least 90%, therefore, it is necessary to charge the battery for 130 minutes or more. Consequently, much time is needed to charge the battery.

Furthermore, in the conventional charging method, the performance of the battery is deteriorated in a case in which a high rate charge current is supplied to the battery in order to improve a charge speed.

In recent years, therefore, much research has been carried out into a charging method that is capable of stably charging a battery within a shorter time while reducing a deterioration rate of the battery and, in addition, there is a high necessity for an improved charging method.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have developed a charging method of a secondary battery including a first charging step of charging the secondary battery at a first C-rate from an initial charge voltage to a first charge voltage and a second charging step of charging the secondary battery to a target voltage while gradually decreasing a C-rate within a range not exceeding the first C-rate after the voltage of the secondary battery reached the first charge voltage and have found that, in a case in which the charging method of the present invention is applied, it is possible to restrain deterioration of the battery, thereby improving lifespan characteristics of the battery. The present invention has been completed based on these findings.

Technical Solution

In accordance with one aspect of the present invention, the above and other technical problems can be solved by the provision of a charging method of a secondary battery including a first charging step of charging the secondary battery at a first C-rate from an initial charge voltage to a first charge voltage and a second charging step of charging the secondary battery to a target voltage while gradually decreasing a C-rate within a range not exceeding the first C-rate after the voltage of the secondary battery reached the first charge voltage, as seen in FIG. 3.

The C-rate is a current rate, which is a unit used to set a current value and to estimate or indicate a possible use time of a battery under various conditions of use during charge and discharge of the battery. A charge or discharge time is divided by a rated capacity of the battery to calculate charge and discharge current values. The unit of the C-rate is C, which is defined as represented by Equation 1 below.

$$\text{C-rate } (C) = \text{Charge and discharge current/Rated capacity of the battery} \quad \text{Equation 1}$$

As previously described, a conventional constant current (CC)-constant voltage (CV) charging method of a secondary battery has a problem in that, in a case in which a high current is supplied to the secondary battery to increase a charge speed, deterioration of the secondary battery is accelerated and, in a case in which the charge speed is decreased, a charge quantity is reduced.

In the charging method of the present invention, on the other hand, the secondary battery is charged using a constant current charging method during a constant current charge period and a low constant current is supplied to the secondary battery when the secondary battery is charged during a constant voltage charge period such that the secondary battery is kept charged using the constant current charging method. That is, in a case in which voltage reaches a specific level or current starts to be decreased from a specific time with the result that it is not possible to continuously supply a constant current to the secondary battery, a low current is supplied to the secondary battery such that the secondary battery is charged at the next step.

In a case in which the above charging method is applied, a charge speed per unit time may be lower than in the conventional CC-CV charging method on the assumption that the same C-rate is applied at the first charging step. However, the difference between the charge speeds is little, whereas a high voltage time may be reduced. Consequently, it is possible to restrain deterioration of the secondary battery, which is preferable.

The first C-rate of the first charging step may have various ranges based on various factors, such as capacity and loading, of the battery. In a preferred example, the first C-rate of the first charging step may have a range from 3 C to 6 C for a 15 to 20 Ah level battery. Preferably, the first C-rate of the first charging step is 6 C. If the C-rate is too small, a charge time is increased, which is not preferable. If the C-rate is too large, on the other hand, a charge quantity is decreased and deterioration of the battery is accelerated, which is also not preferable.

Although the same C-rate is given, a current quantity may be greatly increased for a high-capacity battery and cycle characteristics may be lowered for a battery having a high loading value. In the above batteries, therefore, the C-rate may be set to a lower value than that of the battery according to the present invention.

In the charging method according to the present invention, the gradual decreasing of the C-rate in the second charging step may include stepwise decreasing the C-rate in proportion to the charging time. In a case in which the constant current charge period is set stepwise and the C-rate is reduced stepwise as described above, a charge rate per unit time may be lower than in the conventional CC-CV charging method. However, the difference between the charge rates is little, whereas it is possible to restrain deterioration of the battery, which is preferable.

The decreasing of the C-rate may include stepwise decreasing the C-rate within a range from 3 C to 1 C. In a preferred example, the decreasing of the C-rate may include stepwise decreasing the C-rate in order of 3 C, 2 C, and 1 C.

The initial charge voltage is voltage of the battery before being charged. Those skilled in the art may arbitrarily set a range of the first charge voltage in consideration of conditions, such as charge performance and charge time, of the battery. For example, the first charge voltage may have a range from 4.080 V to 4.095 V and the target voltage may have a range from 4.090 V to 4.100 V within a range equal to or greater than the first charge voltage.

In the charging method according to the present invention, the C-rate may be changed without a time difference. Consequently, it is possible to reduce a charge time.

The charging method according to the present invention may be applied to a lithium secondary battery.

In accordance with another aspect of the present invention, there is provided a secondary battery charged using the charging method as described above. The secondary battery may be a lithium secondary battery.

DESCRIPTION OF DRAWINGS

The above and other objects, features and other advantages of the present invention will be more clearly understood from the following detailed description taken in conjunction with the accompanying drawings, in which.

BEST MODE

Figure 1:
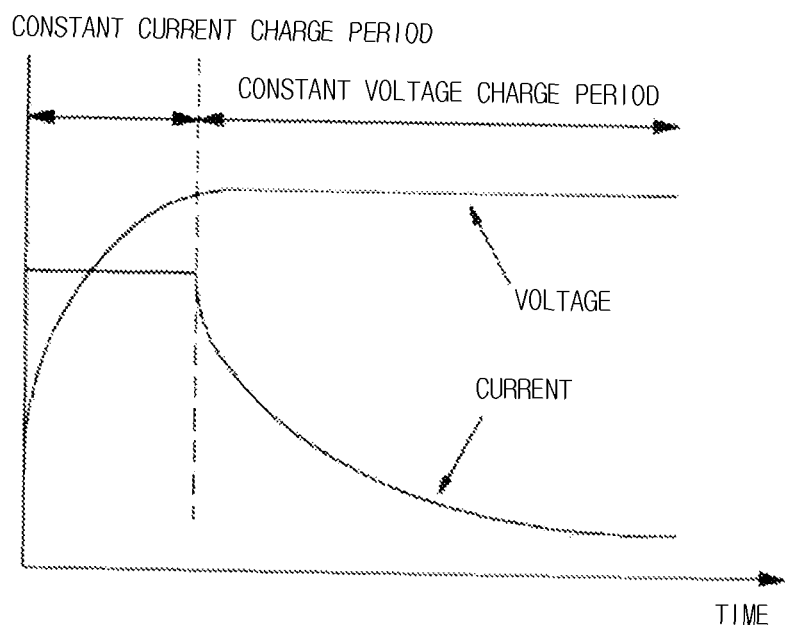
FIG. 1 is a view showing a relationship between a charge current and a charge voltage in a conventional constant current (CC)-constant voltage (CV) charging method of a lithium secondary battery.
Figure 2:
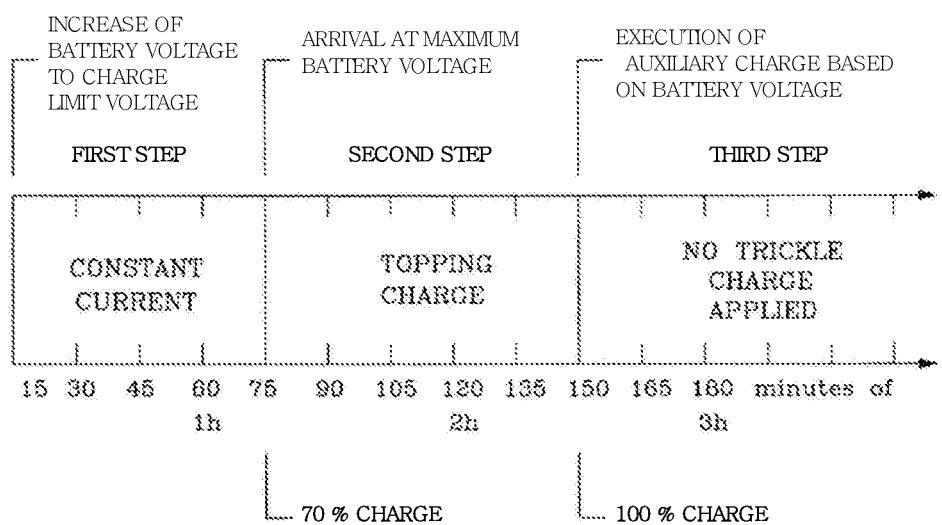
FIG. 2 is a view showing a relationship between a charge period per step shown in FIG. 1 and a charge time.
Figure 3:
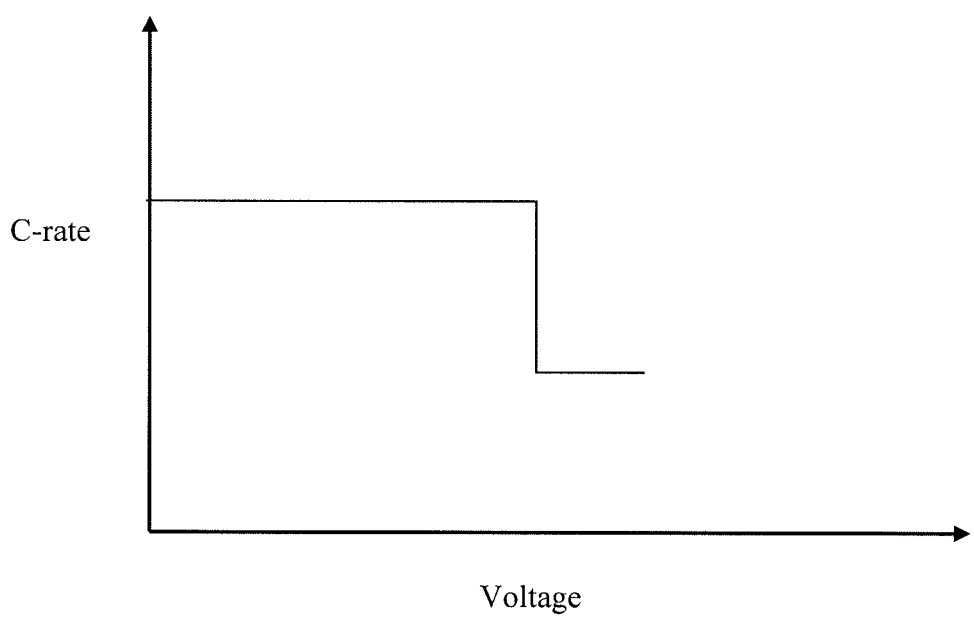
FIG. 3 is a view showing a relationship between the C-rate and voltage.

Now, the present invention will be described in more detail with reference to the following examples. These examples are provided only for illustration of the present invention and should not be construed as limiting the scope and spirit of the present invention.

Experimental Example 1

Charge times and charge quantities based on constant current (CC) charging results of Example 1 and Comparative examples 1 to 4 at a temperature of 30° C. are shown in Table 1 below.

TABLE 1

| 30° C. | CC charging | | Charge time (min) | Charge quantity (Ah) (Percent of 11.2 Ah) |
|---|---|---|---|---|
| Example 1 | 6 C (4.085 V) | 6 C (4.085 V) - 3 C (4.085 V) - 2 C (4.085 V) - 1 C (4.091 V) | 15 | 9.52 (85%) |
| Comparative example 1 | 1 C (15 A), (4.091 V) | | 40 | 10 (89%) |
| Comparative example 2 | 2 C (30 A), (4.091 V) | | 18 | 9 (80%) |
| Comparative example 3 | 3 C (45 A), (4.091 V) | | 11 | 8 (71%) |
| Comparative example 4 | 6 C (90 A), (4.091 V) | | 4 | 5.3 (47%) |

It can be seen from Example 1 of Table 1 above that, in a case in which the stepwise charging method according to the present invention is used, it is possible to increase the charge quantity of the battery without great loss due to the charge time. Consequently, it is possible to reduce a high voltage time, thereby improving lifespan characteristics of the battery while preventing deterioration of the battery.

Experimental Example 2

Charge times and charge quantities based on CC charging results of Examples 2 to 5 and Comparative example 5 and constant current (CC)-constant voltage (CV) charging results of Comparative examples 6 to 8 at a temperature of 25° C. are shown in Table 2 below.

TABLE 21

| 25° C. | CC charging (Examples 2 to 5 and Comparative example 5) CC - CV charging (Comparative examples 6 to 8) | Charge time (min) | Charge quantity (Ah) (Percent of maximum charge quantity 11.6 Ah) |
|---|---|---|---|
| Example 2 | 3 C (4.085 V) - 2 C (4.085 V) - 1 C (4.091 V) | 17.04 | 9.638 (83.09%) |
| Example 3 | 6 C (4.085 V - 3 C (4.085 V) - 2 C (4.085 V) - 1 C (4.091 V) | 14.40 | 9.644 (83.14%) |
| Example 4 | 6 C (4.085 V - 3 C (4.085 V) - 2 C (4.091 V) | 9.48 | 8.589 (74.04%) |
| Example 5 | 6 C (4.091 V) - 3 C (4.091 V) - 2 C (4.091 V) - 1 C (4.091 V) | 13.73 | 9.810 (84.57%) |
| Comparative example 5 | 3 C CC (4.091 V) | 9.61 | 7.208 (62.14%) |
| Comparative example 6 | 3 C CC - CV (1 C cut), (4.091 V) | 14.80 | 9.533 (82.18%) |
| Comparative example 7 | 6 C CC - CV (1 C cut), (4.091 V) | 10.82 | 9.954 (85.81%) |
| Comparative example 8 | 6 C CC - CV (2 C cut), (4.091 V) | 7.70 | 8.687 (74.89%) |

It can be seen from Table 2 above that the batteries according the examples of the present invention charged using the stepwise charging method have longer charge times than the batteries according the comparative examples charged using the CC-CV charging method but the difference in the charge times is little and that, in a case in which the batteries have the same cutting C-rate, the difference in the charge quantities of the batteries of the examples and the comparative examples is little.

In addition, comparison between the battery of Example 1 and the battery of Example 3 of Table 2 reveals that a charge rate is lowered with the decrease of temperature. This is because ion transfer speed is lowered with the decrease of temperature and, therefore, charging is insufficiently carried out. Except the temperature, the battery of Example 1 and the battery of Example 3 have the same conditions. The battery of Example 1 and the battery of Example 3 may have different maximum charge quantities due to deterioration of the batteries during the experiment but the difference between the maximum charge quantities is little.

Experimental Example 3

The batteries of Examples 2 to 5 and Comparative examples 5 to 8 were charged at a temperature of 25° C. under the same conditions as in Table 2 and then discharged under a 2 C CC condition. Charge and discharge energies of the batteries obtained through 2000 cycle charge and discharge with a rest time of 10 minutes after charge and discharge were compared to measure a deterioration rate of the batteries.

TABLE 3

| 25° C. | Deterioration rate (%) | Total charge and discharge energy (KWh) |
|---|---|---|
| Example 2 | 6.36 | 67.667 |
| Example 3 | 6.41 | 67.935 |
| Example 4 | 6.13 | 59.443 |

TABLE 3-continued

| 25° C. | Deterioration rate (%) | Total charge and discharge energy (KWh) |
|---|---|---|
| Example 5 | 7.50 | 62.186 |
| Comparative example 5 | 4.25 | 50.567 |
| Comparative example 6 | 6.04 | 67.132 |
| Comparative example 7 | 8.64 | 68.887 |
| Comparative example 8 | 7.04 | 59.606 |

It can be seen FIG. Table 3 above that the battery of Comparative example 7 CC-CV charged at 6 C has the highest deterioration rate. However, in a case in which a high voltage and a high current are supplied to the battery as in Example 5 although stepwise charging is carried out, the deterioration rate of the battery is increased with the result that the lifespan characteristics of the battery may be lowered.

Meanwhile, the total charge and discharge energy of the battery of Example 3 is similar to that of the battery of Comparative example 7. However, the deterioration rate of the battery of Example 3 is about 25% less than that of the battery of Comparative example 7. As can be seen from Table 2 above, the lifespan of the batteries charged by stepwise 6 C CC charging is about 25% greater than that of the batteries charged by CC-CV charging.

At 3 C charging, a great effect is not obtained. This is because 16 Ah level batteries are tested with the result that there are no problems until the batteries are 6 C charged. For 30 Ah level batteries for BE, however, it is necessary to reduce a C-rate during high speed charge of the batteries. In this case, therefore, it is expected that a desired effect will be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a case in which the charging method of the present invention is applied, it is possible to restrain deterioration of a battery without great loss due to a charge time, thereby improving lifespan characteristics of the battery.

The invention claimed is:
1. A charging method of a secondary battery comprising:
a first charging step of charging the secondary battery at a first C-rate from an initial charge voltage to a first charge voltage; and
a second charging step of charging the secondary battery to a target voltage while gradually decreasing a C-rate within a range not exceeding the first C-rate after the voltage of the secondary battery reached the first charge voltage,
wherein the first C-rate of the first charging step is 6 C,
wherein the gradual decreasing of the C-rate in the second charging step comprises stepwise decreasing the C-rate in proportion to a charge time,
wherein the decreasing of the C-rate comprises stepwise decreasing the C-rate within a range from 3 C to 1 C,
wherein the first charge voltage has a range from 4.080 V to 4.090 V, and wherein the target voltage has a range from 4.090 V to 4.100 V within a range equal to or greater than the first charge voltage.

2. The charging method according to claim 1, wherein the decreasing of the C-rate comprises stepwise decreasing the C-rate in order of 3 C, 2 C, and 1 C.

3. The charging method according to claim 1, wherein the C-rate is changed without a time difference.

4. The charging method according to claim 1, wherein the secondary battery is a lithium secondary battery.

5. A secondary battery charged using a charging method according to claim 1.

6. The secondary battery according to claim 5, wherein the secondary battery is a lithium secondary battery.

* * * * *